United States Patent [19]

Sugio et al.

[11] 4,282,335

[45] Aug. 4, 1981

[54] HIGH MOLECULAR RESIN COMPOSITION

[75] Inventors: Akitoshi Sugio, Ohmiya; Masanobu Masu, Tokyo; Yukio Sasaki, Tokyo; Zenpei Mizutani, Tokyo, all of Japan

[73] Assignee: Mitsubishi Gas Chemical Company, Inc., Tokyo, Japan

[21] Appl. No.: 134,136

[22] Filed: Mar. 26, 1980

[30] Foreign Application Priority Data

Mar. 30, 1979 [JP] Japan .................................. 54/37016

[51] Int. Cl.³ .............................................. C08L 61/04
[52] U.S. Cl. ........................................ 525/68; 525/76; 525/80; 525/84; 525/93; 525/98; 525/104; 525/106
[58] Field of Search ....................... 525/68, 69, 76, 80, 525/84, 85, 92, 93, 104, 106, 98

[56] References Cited

U.S. PATENT DOCUMENTS

| | | | |
|---|---|---|---|
| 3,383,435 | 5/1968 | Cizek | 525/92 |
| 3,660,531 | 5/1972 | Lauchlan et al. | 525/92 |
| 3,661,855 | 1/1968 | Gowan | 525/92 |
| 3,994,856 | 11/1976 | Katohman et al. | 525/92 |
| 4,166,055 | 8/1979 | Lee, Jr. | 525/92 |

FOREIGN PATENT DOCUMENTS

| | | | |
|---|---|---|---|
| 42-7069 | 3/1967 | Japan | 525/92 |
| 42-22069 | 10/1967 | Japan | 525/92 |
| 43-17812 | 7/1968 | Japan | 525/92 |
| 47-32731 | 8/1972 | Japan | 525/92 |

Primary Examiner—J. Ziegler
Attorney, Agent, or Firm—Wenderoth, Lind & Ponack

[57] ABSTRACT

A high molecular resin composition having superior impact strength and processability and comprising a polymeric matrix containing polyphenylene ether and a minor proportion of a low-molecular-weight olefin oligomer dispersed therein.

36 Claims, No Drawings

HIGH MOLECULAR RESIN COMPOSITION

This invention relates to a high molecular resin composition containing polyphenylene ether. More specifically, this invention relates to a high molecular resin composition having superior impact strength and processability and comprising a polymeric matrix containing polyphenylene ether and a minor proportion of a low-molecular-weight olefin oligomer dispersed therein.

Polyphenylene ether generally has superior mechanical properties, but its moldability is poor. Furthermore, its superior impact resistance as one mechanical property is slightly inferior to certain other polymers, and it is desirable to improve such properties.

In an attempt to improve the moldability of polyphenylene ether, methods involving blending polyphenylene ether with polystyrene have previously been suggested (see U.S. Pat. No. 3,383,435, and Japanese Patent Publications Nos. 22069/67 and 17812/68). The resulting blend exhibits improved moldability over the polyphenylene ether, but its impact resistance is not entirely satisfactory.

Accordingly, in order to improve the impact strength of polyphenylene ether to a satisfactory level, methods involving blending polyphenylene ether with a rubbery high-molecular-weight polymer have also been suggested in the past (see U.S. Pat. Nos. 3,660,531 and 3,994,856, and Japanese Patent Publication No. 32731/72). The resulting blend shows improved impact strength over the polyphenylene ether, but since the rubbery polymer increases the melt viscosity of the blend, the moldability of the blend becomes poor. If a large amount of the rubbery polymer is blended in an attempt to improve impact strength further, the load exerted, for example, on the screw in extrusion molding increases, or the flowability of the resin in the mold becomes low in injection molding. In either case, the poor moldability of the blend causes a reduction in productivity.

A method has also been suggested which comprises blending polyphenylene ether with a polyolefin in order to improve the impact strength of the polyphenylene ether. Such a method is disclosed in U.S. Pat. No. 3,361,851 and Japanese Patent Publication No. 7069/67. Unlike the aforesaid conventional methods, this prior method is an attempt to cause the blend to exhibit the advantages of both the polyphenylene ether and the polyolefin. Polypropylene or polyethylene used as a raw material for such molded articles as films or sheets is a high-molecular-weight polyolefin having an average molecular weight of at least about 40,000 and an Izod impact strength of 0.5 to several tens of ft-lb/inch. Thus, this method is intended to afford a blend which exhibits the advantages of both the polyphenylene ether and the high-molecular-weight polyolefin having such a high impact strength by blending the polyphenylene ether and the polyolefin within quantitative ranges which maintain the compatibility of the two.

The present inventors made investigations in order to find a high molecular resin composition having quite a different chemical composition from those of conventional compositions, and which exhibits improved impact strength and moldability without impairing the various inherent properties of polyphenylene ether. These investigations have led to the discovery that when a minor proportion of a low-molecular-weight olefin oligomer is blended with polyphenylene ether, a high molecular resin composition having excellent impact strength and processability is obtained without impairing the excellent inherent properties of polyphenylene ether. This discovery is surprising in view of the fact that the low-molecular-weight olefin oligomer is a brittle wax-like solid easily disintegrable by hand upon solidification after melting, and shows only those properties which are unacceptable as molding materials.

Accordingly, the present invention, in its broadest concept, provides a high molecular resin composition comprising (1) 97 to 99.9% by weight of a polymer matrix containing polyphenylene ether, and
(2) dispersed therein, 0.1 to 3% by weight of an olefin oligomer having a number average molecular weight of not more than about 10,000.

In the present invention, the polymer matrix containing polyphenylene ether denotes a matrix consisting only of polyphenylene ether, and a matrix consisting of a mixture of polyphenylene ether and, for example, a polystyrene-type resin and/or a rubbery polymer. Furthermore, as described hereinbelow, this polymeric matrix may contain plasticizers, etc. as required according to the purpose of use of the final resin composition.

The polyphenylene ether used in this invention is a homopolymer composed of structural units expressed by the following formula

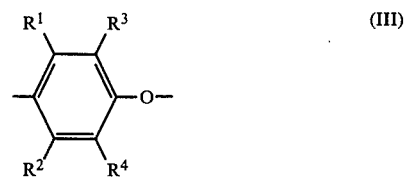

wherein $R^1$, $R^2$, $R^3$ and $R^4$ are identical or different, and each represents hydrogen, halogen, a hydrocarbon group, a cyano group, an alkoxy group, a phenoxy group, or a nitro group, and copolymers including the aforesaid structural units.

In the definition of $R^1$, $R^2$, $R^3$ and $R^4$ in formula (III), the halogen is, for example, fluorine, chlorine and/or bromine, and chlorine is preferred. The hydrocarbon group denotes, for example, an alkyl, alkenyl, aryl or aralkyl group. Alkyl groups are preferred, and lower alkyl groups having 1 to 3 carbon atoms, such as methyl, ethyl or propyl, are especially preferred. The alkoxy group denotes a lower alkoxy group having 1 or 2 carbon atoms such as methoxy or ethoxy.

Specific examples of the polyphenylene ether include homopolymers, for example poly-2,6-dialkyl-1,4-phenylene ethers such as poly-2,6-dimethyl-1,4-phenylene ether, poly-2,6-diethyl-1,4-phenylene ether or poly-2,6-dipropyl-1,4-phenylene ether, 2,6-diaryl-1,4-phenylene ethers such as poly-2,6-diphenyl-1,4-phenylene ether, and other homopolymers such as poly-2-methyl-6-chloro-1,4-phenylene ether and poly-2-methoxy-6-methyl-1,4-phenylene ether; and copolymers composed of a structural unit of formula (III) in which $R^1$ and $R^2$ are alkyl groups and $R^3$ and $R^4$ are each hydrogens and a structural unit of formula (III) in which $R^1$, $R^2$ and $R^3$ are all alkyl groups and $R^4$ is hydrogen, i.e. a copolymer of a 2,6-dialkylphenol and a 2,3,6-trialkyl phenol, such as a copolymer of 2,6-dimethylphenol and 2,3,6-trimethylphenol. Among these poly-2,6-dialkyl-1,4-phenylene ethers and a copolymer of a 2,6-dialkylphenol and a 2,3,6-trialkylphenol are preferred. Especially preferred are poly-2,6-dimethyl-1,4-phenylene ether, poly-2,6-diethylphenylene ether, and a copolymer of 2,6-dimethylphenol and 2,3,6-trimethylphenol. Above all, poly-2,6-dimethyl-1,4-phenylene ether and a copolymer of 2,6-dimethylphenol and 2,3,6-trimethylphenol are preferred.

Methods for producing such polyphenylene ethers are well known, and for example, they can be obtained by oxidative coupling of the corresponding phenols.

It has now been discovered that the impact strength and moldability of the polyphenylene ether polymer or copolymer can be improved by including a specified small proportion of an olefin oligomer having a low molecular weight specified below in such a polymer or copolymer.

It has also been found in accordance with this invention that when an olefin oligomer having a specified molecular weight is included in a matrix consisting of a mixture of polyphenylene ether and a polystyrene resin and/or a rubbery polymer, the impact strength and moldability of the polymer matrix can be similarly improved.

Thus, according to another aspect of this invention, there is provided a high molecular resin composition comprising 97 to 99.9% by weight of a polymer matrix containing polyphenylene ether and a polystyrene resin and/or a rubbery polymer, and dispersed therein, 0.1 to 3% by weight of an olefin oligomer having a number average molecular weight of not more than about 10,000.

The rubbery polymer is preferably a rubbery block copolymer. The polystyrene-type resin can be incorporated in the polymeric matrix in an amount of not more than 95% by weight, preferably not more than 80% by weight, based on the polymeric matrix. The rubbery block copolymer can be incorporated in the polymeric matrix in an amount of not more than 20% by weight, preferably not more than 10% by weight.

The polystyrene-type resin that may be included in the polymeric matrix is, for example, a homopolymer having a structural unit of the following formula

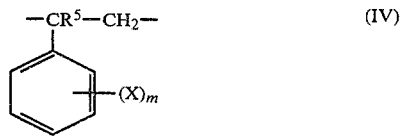

wherein $R^5$ is hydrogen or an alkyl group, X represents halogen or an alkyl group, and m is 0 or an integer of 1 to 5, or a copolymer containing at least 25 mole%, preferably at least 30 mole%, of the above structural unit.

In formula (IV), the alkyl groups for $R^5$ and X, independently from each other, represent methyl, ethyl, propyl, etc. Of these, methyl is especially preferred. The halogen for X is, for example, fluorine, chlorine, bromine, etc. Chlorine is especially preferred.

The homopolymer having the structural unit of formula (IV) is, for example, a homopolymer of a styrene monomer of the following formula

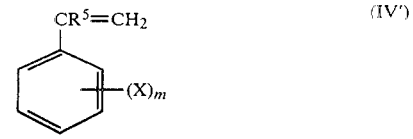

wherein $R^5$, X and m are as defined in formula (IV), such as styrene, α-methylstyrene, vinyltoluene or nuclearly chlorinated styrene.

Examples of the copolymers having at least 25 mole% of the structural unit of formula (IV) are copolymers of the styrene monomers of formula (IV') with each other, and copolymers of at least one styrene monomer of formula (IV') with at least one other mono-vinyl monomer and/or a conjugated diene monomer. Examples of the mono-vinyl monomers other than the styrene monomers of formula (IV') are ethylene, propylene, acrylonitrile, and methyl methacrylate. Examples of the conjugated diene monomers are butadiene, isoprene and chloroprene.

The aforesaid styrene copolymers may be any of random copolymers and graft copolymers if they contain at least 25 mole%, preferably at least 30 mole%, of the structural unit of formula (IV).

Examples of the polystyrene resins used in this invention include polystyrene, graft copolymers (e.g., styrene-grafted polybutadiene rubber resulting from graft copolymerization of polybutadiene with styrene), a blend of polystyrene and styrene-grafted polybutadiene, a random copolymer of styrene and acrylonitrile (to be written as a styrene-acrylonitrile copolymer; the same manner of writing applies to the following exemplification), a styrene-butadiene copolymer, a styrene-ethylene copolymer, a styrene-propylene copolymer, a styrene-methyl methacrylate copolymer, a styrene-isoprene copolymer, a styrene-chloroprene copolymer, a styrene-butadiene-acrylonitrile copolymer, and an ethylene-propylene-butadiene-styrene copolymer.

Among the above polystyrene resins, polystyrene, and a blend of polystyrene and styrene-grafted polybutadiene in which the latter is dispersed in the former (known as rubber-modified high impact polystyrene) are especially preferred.

The polystyrene resin may be included in the polymeric matrix in an amount of not more than 95% by weight, preferably not more than 80% by weight, based on the polymeric matrix. Within such a weight range, the advantages of the polyphenylene ether and the polystyrene resin can be retained in a well balanced condition.

A rubbery polymer is another polymer which may be included in the polymeric matrix of this invention. The rubbery polymer may be any of homopolymers, random copolymers or block copolymers of conjugated dienes, monolefins, alkylene oxides, etc. Examples of the homopolymers or random copolymers include so-called rubbery polymers such as polybutadiene, polyisoprene, polychloroprene, an ethylene-propylene-diene copolymer and polyisobutylene, and polyalkylene ethers such as polyethylene oxide, polypropylene oxide and polyepichlorohydrin.

Copolymers, particularly rubbery block copolymers, of dienes such as butadiene and vinyl aromatic hydrocarbons such as styrene are preferred for use in this invention.

Examples of such rubbery block copolymers include block copolymers of the following formula

A—B—A' (I)

wherein A and A' are identical or different, and represent blocks of polymerized vinyl aromatic hydrocarbon monomers, and B is a block of a polymerized conjugated diene monomer, and block copolymers of the following formula

A—B'—A' (II)

wherein A and A' are as defined above, and B' is a block of a conjugated diene monomer polymerized and hydrogenated.

In the formulae (I) and (II) above, the block of a polymerized vinyl aromatic hydrocarbon monomer for A and A' denotes a homopolymer or copolymer block obtained by polymerizing at least one vinyl aromatic hydrocarbon monomer such as styrene, α-methylstyrene, vinyltoluene, vinylxylene or vinylnaphthalene. The block of a polymerized conjugated diene represented by B in formula (I) denotes a homopolymer or copolymer block obtained by polymerizing at least one conjugated diene monomer such as butadiene, isoprene, 1,3-pentadiene and 2,3-dimethylbutadiene.

The block of a conjugated diene monomer polymerized and hydrogenated which is represented by B' in formula (II) denotes a block obtained by hydrogenating the aforesaid homopolymer or copolymer block of conjugated diene monomer to reduce the degree of unsaturation of such a block.

The method for producing the rubbery block copolymers used in this invention is well known to those skilled in the art.

Among the above rubbery block copolymers, preferred are rubbery block copolymers of formula (I) in which both A and A' are polystyrene blocks and B is a polybutadiene block, and rubbery block copolymers of formula (II) in which A and A' are polystyrene blocks and B' is a hydrogenated polybutadiene block.

The rubbery block copolymer may be included in the polymeric matrix in an amount of not more than 20% by weight, preferably not more than 10% by weight, based on the polymeric matrix.

When the content of the rubbery block copolymer exceeds 20% by weight, the rigid strength of the high molecular resin composition decreases, and the flowability of the resin composition during melting tends to decrease.

It is also possible in this invention to include both the aforesaid polystyrene resin and the aforesaid rubbery polymer, preferably the rubbery block copolymer, in the polymeric matrix. In this case, the rubbery block copolymer of formula (I) is preferably used as the rubbery block copolymer. The especially preferred amount of the rubbery block copolymer is not more than 10% by weight, and the amount of the polystyrene resin is not more than 80% by weight, both based on the polymeric matrix.

The high molecular resin composition of this invention comprises 97 to 99.9% by weight of a polymeric matrix containing polyphenylene ether, such as the polyphenylene ether alone, or a mixture of the polyphenylene ether with the polystyrene resin and/or rubbery copolymer, and dispersed therein, 0.1 to 3% by weight of the olefin oligomer having a number average molecular weight of not more than about 10,000.

The olefin oligomer having such a low molecular weight used in this invention is a brittle wax-like solid which when melted and solidified, can be easily disintegrated by hand. Accordingly, unlike high molecular polyolefins having a molecular weight of, for example, more than 40,000 generally used in producing molded articles such as films, the olefin oligomer by itself does not have moldability and cannot be used as molding material.

It was quite unexpected that the inclusion of a minor proportion of such a low-molecular-weight olefin oligomer improves the impact strength and processability, especially the former, of a high molecular resin composition containing polyphenylene ether.

The olefin oligomer used in this invention has a number averge molecular weight of not more than about 10,000, preferably about 1,000 to about 10,000, more preferably about 1,000 to about 5,000. Olefin oligomers having a number average molecular weight of more than about 10,000 produce only a small effect of improving the melt-processability of a resin composition containing polyphenylene ether.

The amount of the olefin oligomer having a number average molecular weight of not more than about 10,000 used in this invention is 0.1 to 3% by weight, preferably 0.1 to 1% by weight, based on the polymer resin composition.

If the amount of the olefin oligomer is less than 0.1%, no marked improvement in impact strength can be obtained. If it exceeds 3% by weight, the olefin oligomer does not have sufficient compatibility with the polymeric matrix containing polyphenylene ether, and therefore, molded articles prepared from the high molecular resin composition have poor surface condition. For example, surface gloss is reduced to impair the aesthetic characteristics of the molded articles. Furthermore, the various properties of the molded articles are deteriorated.

When the olefin oligomer is used in an amount of 0.1 to 1% by weight which is the preferred range, the properties and processability of the high molecular resin composition are improved with a good balance between them.

Preferred olefin oligomers are homo-oligomers or co-oligomers of vinyl-type olefin monomers.

Examples of the olefin oligomers include (a) homo-oligomers of vinyl-type olefin monomers such as ethylene, propylene or butylene, (b) co-oligomers of the aforesaid vinyl-type olefin monomers with each other, and (c) halogenated oligomers obtained by halogenation of the homo-oligomers (a) or co-oligomers (b).

Examples of the homo-oligomers (a) are an ethylene oligomer (homo-oligoethylene), homo-oligopropylene and homo-oligobutylene. Examples of the co-oligomers (b) include an ethylene-propylene co-oligomer, an ethylene-butylene co-oligomer, a propylene-butylene co-oligomer, and an ethylene-propylene-butylene co-oligomer. Examples of the halogenated oligomers (c) are halogenated products of the specific oligomers or co-oligomers (a) and (b) listed above, such as their fluorides and chlorides. Chloroethylene oligomer and fluoroethylene oligomer are specific examples.

Among the aforesaid olefin oligomers, homo-oligoethylene, homo-oligopropylene and an ethylene-propylene co-oligomer are especially preferred. As stated hereinabove, these olefin oligomers used in this invention have a number average molecular weight of not more than about 10,000.

Conventional resin additives, such as plasticizers, stabilizers, lubricants, flame retardants, pigments, dyes and fillers, may be included into the polymeric matrix containing polyphenylene ether, according to the uses of the resulting high molecular resin composition.

The resulting pellets were molded in an injection molding machine to form test specimens for the various tests shown in Table 1.

The results are shown in Table 1. In Table 1, and subsequent tables, the content in weight percent of the ethylene oligomer is based on the resulting high molecular resin composition.

TABLE 1

| | | | Test item | | | | | |
|---|---|---|---|---|---|---|---|---|
| Run No. | Content of ethylene oligomer (wt. %) | Q-value of pellets (cm³/sec.) (*1) | Izod impact strength (notched; ⅛ inch; kg·cm/cm) | Tensile impact strength, 1/16 inch, S-type (kg·cm/cm²) | Tensile strength (⅛ inch, kg/cm²) at yield | at break | Elongation at break (%) | Surface condition of the molded article (observed with the naked eye) |
| 1 | 0 | $3.6 \times 10^{-3}$ | 4.0 | 400 | 740 | 660 | 90 | Excellent |
| 2 | 0.5 | $4.1 \times 10^{-3}$ | 4.7 | 430 | 740 | 660 | 90 | Excellent |
| 3 | 1 | $4.6 \times 10^{-3}$ | 5.3 | 450 | 740 | 660 | 90 | Excellent |
| 4 | 3 | $5.9 \times 10^{-3}$ | 8.3 | 360 | 720 | 620 | 70 | Good |
| 5 | 5 | $10.5 \times 10^{-3}$ | 11.5 | 60 | — (*2) | 610 | 10 | Poor |

(*1): Measured by a Koka-type flow tester. A nozzle, 1φ × 2 mm, was used, and the Q-values are the extrusion speeds (cm³/sec.) at 290° C. and 60 kg/cm².
(*2): This shows that the specimen broke before it reached a yield point.

The high molecular resin composition of this invention can be easily produced by a known method of melt-mixing thermoplastic resins. For example, a convenient method generally used comprises mixing polyphenylene ether and, optionally the polystyrene resin and/or rubbery polymer, with the olefin oligomer in predetermined mixing proportions in a mixer, then fully kneading the resulting mixture in a melt-extruder, and extruding the resultant uniform melt to form pellets.

The following Examples illustrate the present invention in detail. It should be noted that the invention is in no way limited by these examples. In these Examples, all percentages (%) are by weight unless otherwise specified.

EXAMPLE 2

High molecular resin compositions were prepared which contained a polyphenylene ether copolymer composed of 95 mole% of 2,6-dimethylphenol and 5 mole% of 2,3,6-trimethylphenol and having an intrinsic viscosity, measured in chloroform at 30° C., of 0.50 dl/g, and a low-molecular-weight propylene oligomer having a number average molecular weight of about 4,000 (Viscol 550P, a product of Sanyo Chemical Ind. Co. Ltd.) in the amounts shown in Table 2.

The preparation and molding of each of these resin compositions were performed in the same way as in Example 1. The results are shown in Table 2.

TABLE 2

| | | | Test item | | | | | |
|---|---|---|---|---|---|---|---|---|
| Run No. | Content of propylene oligomer (wt. %) | Q-value of pellets (cm³/sec.) (*1) | Izod impact strength, notched ⅛ inch (kg·cm/cm) | Tensile impact strength (1/16 inch, S-type) (kg·cm/cm²) | Tensile strength (⅛ inch, kg/cm²) at yield | at break | Elongation at break (%) | Surface condition of the molded article (observed with the naked eye) |
| 1 | 0 | $3.9 \times 10^{-3}$ | 3.9 | 400 | 750 | 660 | 90 | Excellent |
| 2 | 0.5 | $4.3 \times 10^{-3}$ | 5.0 | 450 | 750 | 660 | 90 | Excellent |
| 3 | 1 | $4.7 \times 10^{-3}$ | 6.0 | 510 | 740 | 680 | 90 | Excellent |
| 4 | 3 | $6.6 \times 10^{-3}$ | 9.4 | 420 | 710 | 580 | 50 | Good |
| 5 | 5 | $8.5 \times 10^{-3}$ | 13.9 | 40 | — (*2) | 530 | 10 | Poor |

(*1) and (*2): Same as the footnote to Table 1.

EXAMPLE 1

High molecular resin compositions were prepared which contained poly-2,6-dimethyl-1,4-phenylene ether having an intrinsic viscosity, measured in chloroform at 30° C., of 0.50 dl/g and a low-molecular-weight ethylene oligomer having an average molecular weight of about 2,000 (Sanwax 1519, a product of Sanyo Chemical Ind. Co., Ltd.) in the amounts indicated in Table 1.

Each of these resin compositions was prepared by mixing predetermined amounts of powdery poly-2,6-dimethyl-1,4-phenylene ether and powdery ethylene oligomer in a mixer, melt-kneading the mixture in a twin-screw extruder, and extruding the homogenous mixture to form pellets.

EXAMPLE 3

High molecular resin compositions were prepared which contained a polymeric matrix consisting of 39% by weight of a polyphenylene ether copolymer composed of 95 mole% of 2,6-dimethylphenol and 5 mole% of 2,3,6-trimethylphenol and having an intrinsic viscosity, measured in chloroform at 30° C., of 0.51 dl/g, 50% by weight of rubber-modified high impact polystyrene (content of the grafted rubber gel phase 13% by weight; the intrinsic viscosity of the polystyrene matrix, measured in chloroform at 25° C., was 0.89 dl/g), 4% by weight of a styrene-butadiene-styrene block copolymer (containing an intermediate block of rubbery polybutadiene, and polystyrene blocks at both ends; its 20% by weight toluene solution showed a viscosity of 1500 c.p. when it was measured by a Brookfield viscometer at 25° C.), 6% by weight of titanium oxide and 1% by weight of a stabilizer, and ethylene oligomer having a number average molecular weight of about 2,000 in the amounts shown in Table 3.

The preparation and molding of each of the high molecular resin compositions were performed under the same conditions as in Example 1. The results obtained are shown in Table 3.

oligomer having a number average molecular weight of about 4,000 in the amounts shown in Table 4.

The preparation and molding of each of these high molecular resin compositions were performed in the same way as in Example 1. The results are shown in Table 4.

TABLE 4

| | | | | | Tensile strength (kg/cm²) | | | Gloss of the surface of the molded article (*4) |
|---|---|---|---|---|---|---|---|---|
| Run No. | Content of olefin oligomer (wt. %) | Q-values of pellets (cm³/sec.) (*3) | Izod impact strength (notched) ⅛ inch (kg · cm/cm) | Tensile impact strength, 1/16 inch, S-type (kg · cm/cm²) | at yield | at break | Elongation at break (%) | |
| 1 | 0 | 3.5 × 10⁻² | 14 | 100 | 440 | 470 | 40 | 66 |
| 2 | ethylene oligomer (1) | 4.0 × 10⁻³ | 18 | 130 | 440 | 490 | 30 | 75 |
| 3 | propylene oligomer (1) | 4.0 × 10⁻³ | 18 | 150 | 440 | 470 | 40 | 80 |

(*3) and (*4) are the same as the footnote to Table 3.

EXAMPLE 5

High molecular resin compositions were prepared which contained a polymeric matrix consisting of 39% by weight of a polyphenylene ether composed of 95 mole% of 2,6-dimethylphenol and 5 mole% of 2,3,6-trimethylphenol and having an intrinsic viscosity, measured in chloroform at 30° C., of 0.52 dl/g, 50% by weight of rubber-modified high impact polystyrene, 3.5% by weight of a styrene-butadiene-styrene block copolymer, 6.5% by weight of titanium oxide and 1% by weight of a stabilizer, and ethylene oligomer having a number average molecular weight of about 9,000 (Wax PE-190, a product of Hoechst AG) in the amounts indicated in Table 5.

The preparation and molding of each of the high molecular resin compositions were performed in the same way as in Example 1. The results are shown in Table 5.

TABLE 3

| | | | | | Tensile strength ⅛ inch (kg/cm²) | | | Gloss of the surface of the molded article (*4) |
|---|---|---|---|---|---|---|---|---|
| Run No. | Content of ethylene oligomer (wt. %) | Q-value of pellets (cm³/sec) (*3) | Izod impact strength (notched) ⅛ inch (kg · cm/cm) | Tensile impact strength, 1/16 inch, S-type (kg · cm/cm²) | at yield | at break | Elongation at break (%) | |
| 1 | 0 | 4.5 × 10⁻³ | 15 | 130 | 550 | 500 | 30 | 72 |
| 2 | 1 | 5.0 × 10⁻³ | 17 | 140 | 530 | 490 | 40 | 77 |
| 3 | 3 | 6.6 × 10⁻³ | 21 | 130 | 510 | 480 | 40 | 77 |
| 4 | 4.5 | 8.6 × 10⁻³ | 20 | 90 | 420 | 470 | 40 | 61 |

(*3): Measured by a Koka-type flow tester. A nozzle, 1φ × 2 mm, was used, and the Q-values are the extrusion speeds (cm³/sec.) at 230° C. and 60 kg/cm².
(*4): Values measured at an angle of incidence of 45°.

EXAMPLE 4

High molecular resin compositions were prepared which contained a polymeric matrix consisting of 39% by weight of a polyphenylene ether copolymer composed 95 mole% of 2,6-dimethylphenol and 5 mole% of 2,3,6-trimethylphenol and having an intrinsic viscosity, measured in chloroform at 35° C., of 0.51 dl/g, 44.5% by weight of rubber-modified high impact polystyrene, 2.5% by weight of a styrene-butadiene-styrene block copolymer, 6% by weight of titanium oxide, 0.5% by weight of a stabilizer and 7.5% by weight of triphenyl phosphate, and ethylene oligomer having a number average molecular weight of about 2,000 or propylene

TABLE 5

| | | | | | Tensile strength ⅛ inch (kg/cm²) | | | Gloss of the surface of the molded article (*4) |
|---|---|---|---|---|---|---|---|---|
| Run No. | Content of the ethylene oligomer (wt. %) | Q-value of pellets (cm³/sec) (*3) | Izod impact strength (notched) ⅛ inch (kg · cm/cm) | Tensile impact strength, 1/16 inch; S-type (kg · cm/cm²) | at yield | at break | Elongation at break (%) | |
| 1 | 0 | 3.8 × 10⁻³ | 14 | 130 | 560 | 520 | 30 | 69 |
| 2 | 1 | 4.3 × 10⁻³ | 16 | 140 | 560 | 520 | 40 | 73 |

TABLE 5-continued

| Run No. | Content of the ethylene oligomer (wt. %) | Q-value of pellets (cm³/sec) (*3) | Izod impact strength (notched) ⅛ inch (kg · cm/cm) | Tensile impact strength, 1/16 inch; S-type (kg · cm/cm²) | Tensile strength ⅛ inch (kg/cm²) at yield | at break | Elongation at break (%) | Gloss of the surface of the molded article (*4) |
|---|---|---|---|---|---|---|---|---|
| 3 | 2 | 5.1 × 10⁻³ | 18 | 140 | 550 | 500 | 40 | 72 |

(*3) and (*4) are the same as the footnote to Table 3.

What we claim is:

1. A high molecular resin composition comprising
  (1) 97 to 99.9% by weight of a polymeric matrix containing polyphenylene ether, and
  (2) dispersed therein, 0.1 to 3% by weight of an olefin oligomer having a number average molecular weight of not more than about 10,000.

2. The resin composition of claim 1 wherein said polymeric matrix is polyphenylene ether.

3. The resin composition of claim 1 wherein said polymeric matrix contains polyphenylene ether and a polystyrene resin or a rubbery polymer.

4. The resin composition of claim 1 wherein said polymeric matrix contains polyphenylene ether and not more than 95% by weight, based on the polymeric matrix, of a polystyrene resin.

5. The resin composition of claim 4 wherein said polymeric matrix contains polyphenylene ether and not more than 80% by weight, based on the polymeric matrix, of a polystyrene resin.

6. The resin composition of claim 1 wherein said polymeric matrix contains polyphenylene ether and not more than 20% by weight, based on the polymeric matrix, of a rubbery block copolymer of the following formula

    A—B—A'    (I)

wherein A and A' are identical or different, and represent blocks of a polymerized vinyl aromatic hydrocarbon, and B is a block of a polymerized conjugated diene monomer.

7. The resin composition of claim 6 wherein the proportion of said rubbery block copolymer of formula (I) is not more than 10% by weight based on the weight of the polymeric matrix.

8. The resin composition of claim 1 wherein the polymeric matrix contains polyphenylene ether and not more than 20% by weight, based on the polymeric matrix, of a rubbery block copolymer of the following formula

    A—B'—A'    (II)

wherein A and A' are identical or different and represent blocks of a polymerized vinyl aromatic hydrocarbon, and B' is a block of a hydrogenated polymer of a conjugated diene monomer.

9. The resin composition of claim 8 wherein the amount of the rubbery block copolymer of formula (II) is not more than 10% by weight based on the weight of the polymeric matrix.

10. The resin composition of claim 6 wherein said polymeric matrix contains polyphenylene ether, not more than 80% by weight, based on the polymeric matrix, of a polystyrene resin, and not more than 10% by weight, based on the polymeric matrix, of the rubbery block copolymer of formula (I).

11. The resin composition of any one of claims 1 to 10 wherein said polyphenylene ether is a homopolymer of a structural unit of the following formula

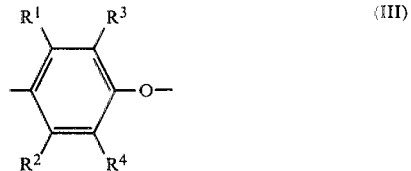

wherein $R^1$, $R^2$, $R^3$ and $R^4$ are identical or different, and each represents hydrogen, halogen, a hydrocarbon group, a cyano group, an alkoxy group, a phenoxy group or a nitro group, or a copolymer containing said structural unit.

12. The resin composition of claim 11 wherein said polyphenylene ether is a poly-2,6-dialkyl-1,4-phenylene ether, which is a homopolymer of the structural unit of formula (III) in which $R^1$ and $R^2$ are alkyl groups and $R^3$ and $R^4$ are each hydrogen.

13. The resin composition of claim 12 wherein said polyphenylene ether is poly-2,6-dimethyl-1,4-phenylene ether.

14. The resin composition of claim 12 wherein said polyphenylene ether is poly-2,6-diethyl-1,4-phenylene ether.

15. The resin composition of claim 11 wherein said polyphenylene ether is a copolymer of a 2,6-dialkylphenol and a 2,3,6-trialkylphenol, which is a copolymer composed of a structural unit of formula (III) in which $R^1$ and $R^2$ are alkyl groups and $R^3$ and $R^4$ are each hydrogen, and a structural unit for formula (III) in which $R^1$ and $R^2$ and $R^3$ are alkyl groups and $R^4$ is hydrogen.

16. The resin composition of claim 15 wherein said polyphenylene ether is a copolymer of 2,6-dimethylphenol and 2,3,6-trimethylphenol.

17. The resin composition of claim 1 wherein said olefin oligomer is an oligomer of a vinyl olefin monomer.

18. The resin composition of claim 1 or 17 wherein said olefin oligomer is at least one member selected from the group consisting of
  (a) a homo-oligomer of ethylene, propylene or butylene,
  (b) a co-oligomer of at least two of the monomers in (a) with each other, and
  (c) a halogenated oligomer resulting from the halogenation of said homo-oligomer (a) or co-oligomer (b).

19. The resin composition of claim 18 wherein said olefin oligomer is homo-oligoethylene.

20. The resin composition of claim 18 wherein said olefin oligomer is homo-oligopropylene.

21. The resin composition of claim 18 wherein said olefin oligomer is a co-oligomer of ethylene and propylene.

22. The resin composition of any one of claims 1, 17 and 19 to 21 wherein said olefin oligomer has a number average molecular weight of about 1,000 to about 10,000.

23. The resin composition of any one of claims 1, 17 and 19 to 21 wherein the proportion of said olefin oligomer is 0.1 to 1% by weight.

24. The resin composition of claim 4 or 5 wherein said polystyrene resin is a homopolymer of a structural unit of the following formula

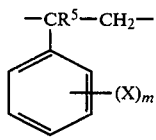

wherein $R^5$ is hydrogen or an alkyl group, X is halogen or an alkyl group, and m is 0 or an integer of 1 to 5, or a copolymer containing at least 25 mole% of said structural unit.

25. The resin composition of claim 24 wherein said polystyrene resin is at least one resin selected from the group consisting of
 (a) a homopolymer of styrene, α-methylstyrene, vinyltoluene or nuclearly chlorinated styrene,
 (b) a copolymer of at least two of the monomers in (a) with each other,
 (c) a copolymer of at least one of the monomers in (a) and at least one mono-vinyl monomer other than the monomers in (a),
 (d) a copolymer of at least one of the monomers in (a) and at least one conjugated diene monomer, and
 (e) a copolymer of at least one of the monomers in (a), at least one mono-vinyl monomer other than the monomers in (a), and at least one conjugated diene monomer.

26. The resin composition of claim 25 wherein said polystyrene resin is homopolystyrene.

27. The resin composition of claim 25 wherein said polystyrene resin is rubber-modified high impact polystyrene which is a blend of polystyrene and styrene-grafted polybutadiene.

28. The resin composition of claim 25 wherein said polystyrene resin is at least one styrene copolymer selected from the group consisting of styrene-acrylonitrile copolymer, styrene-butadiene copolymer, styrene-ethylene copolymer, styrene-propylene copolymer, styrene-methyl methacrylate copolymer, styrene-isoprene copolymer, styrene-chloroprene copolymer, styrene-butadiene-acrylonitrile copolymer and ethylene-propylene-butadiene-styrene copolymer.

29. The resin composition of claim 6 or 7 wherein in formula (I), A and A' represent a block of a polymer of at least one aromatic vinyl monomer selected from the group consisting of styrene, α-methylstyrene, vinyltoluene, vinylxylene and vinylnaphthalene, and B represents a block of a polymer of at least one conjugated diene monomer selected from the group consisting of butadiene, isoprene, 1,3-pentadiene and 2,3-dimethylbutadiene.

30. The resin composition of claim 29 wherein in formula (I), A and A' are polystyrene blocks and B is a polybutadiene block.

31. The resin composition of claim 8 or 9 wherein in formula (II), A and A' represent a block of a polymer of at least one aromatic vinyl monomer selected from the group consisting of styrene, α-methylstyrene, vinyltoluene, vinylxylene and vinylnaphthalene, and B' is a polymer block obtained by polymerizing at least one conjugated diene monomer selected from the group consisting of butadiene, isoprene, 1,3-pentadiene and 2,3-dimethylbutadiene, and hydrogenating the polymer.

32. The resin composition of claim 31 wherein in formula (II), A and A' are polystyrene blocks, and B' is a hydrogenated polybutadiene block.

33. The resin composition of claim 18 wherein said olefin oligomer has a number average molecular weight of about 1,000 to about 10,000.

34. The resin composition of claim 18 wherein the proportion of said olefin oligomer is 0.1 to 1% by weight.

35. The resin composition of claim 22 wherein the proportion of said olefin oligomer is 0.1 to 1% by weight.

36. The resin composition of claim 1 wherein said olefin oligomer has a number average molecular weight of about 1,000 to about 5,000.

* * * * *